United States Patent Office 3,574,234
Patented Apr. 6, 1971

3,574,234
DERIVATIVES OF 4-HYDROXY COUMARINE
Eugene Boschetti, Venissieux, Darius Molho, Boulogne-sur-Seine, and Louis Fontaine, Lyon, France, assignors to Lipha, Lyonnaise Industrielle Pharmaceutique
No Drawing. Filed Dec. 11, 1967, Ser. No. 689,347
Claims priority, application France, Dec. 13, 1966, 87,213; Nov. 13, 1967, 127,915
Int. Cl. A61k 27/00; C07d 63/12
U.S. Cl. 260—332.2      6 Claims

ABSTRACT OF THE DISCLOSURE 4-hydroxy coumarines represented by the formula

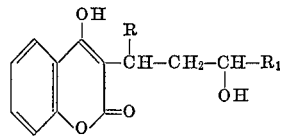

in which:
R is a member of the group formed by the thienyl, methyl-thienyl, halothienyl and nitrothienyl radicals; and
$R_1$ is a member of the group formed by the methyl, phenyl, halophenyl, nitrophenyl, diphenyl, halodiphenyl and nitrodiphenyl radicals, and processes for their preparation.

---

The present invention relates to new derivatives of 4-hydroxy coumarine and processes for the preparation thereof. These new compounds are represented by the Formula I (I) 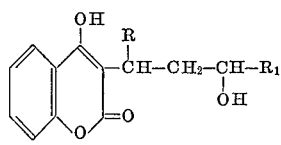

in which:
R is a member of the group formed by the thienyl, methyl thienyl, halothienyl and nitrothienyl radicals;
$R_1$ is a member of the group formed by the methyl, phenyl, halophenyl, nitrophenyl, diphenyl, halodiphenyl, and nitrodiphenyl radicals.

These new substituted 4-hydroxy coumarines have very strong oral anticoagulant activities of the antivitamin K type and are capable of being used in this connection, not only in human therapeutics, but also as a raticide.

It has been found that the reduction of the carbonyl grouping of the intermediate molecules to a carbinol grouping increases to a very considerable degree the hypoprothrombinemiant activity of these compounds.

In addition, it has been observed that, in the series of the thienyl 4-hydroxy coumarines, the presence of certain substituents, particularly halogens, strengthens in remarkable manner the capacity of lowering the amount of prothrombin of the blood as possessed by these compounds.

The compounds of the general Formula I are molecules having two asymmetrical carbons and having not very high melting points. It has been assumed that these derivatives are probably formed of a mixture of two possible racemic diastereoisomers. In certain cases, as specified in the examples, one of the isomers of higher melting point has been isolated. It was checked that the hypoprothrombinemiant activity is identical for both forms.

The intermediate ketonic compounds of general formula II (II) 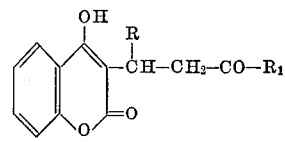

in which R and $R_1$ have the same meanings as in Formula I are described as synthesis intermediates.

They are obtained by condensation of the 4-hydroxy coumarine with an α-ethylenic ketone of the general Formula III R—CH=CH—CO—$R_1$ in which R and $R_1$ have the same meanings as before.

This condensation, in accordance with the Michael method, can be effected in the presence of alkali, mineral or organic agents. It is preferably carried out in the presence of traces of hexamethylene imine in aqueous or hydro-alcoholic medium or of a small quantity of piperidine in dioxane as solvent.

The reduction of the intermediate compounds of Formula II in alcohol can be effected either by the action of aluminium isopropylate in isopropanol, or by the action of a hydride of alkali metal and boron, such as sodium or potassium borohydride.

Certain α-ethylenic ketones which can be used particularly in the preparation of the compounds of the invention are novel in themselves and as such also form part of the invention. They are particularly derivatives which come within the scope of the general Formula III, particularly 1-chlorophenyl-3-(5'-chloro-2'-thienyl) - 2 - propen-1-one, 1-phenyl-3(5' - bromo - 2' - thienyl)-2-propen-1-one, 1-phenyl-3-(5'-methyl-2'-thienyl)-2-propen - 1 - one, 1-parabromophenyl-3-(5'-bromo - 2' - thienyl) - 2-propen-1-one, 5'-bromothenylidene-p - (4' - bromophenyl)acetophenone, thenylidene-p - (4'-bromophenyl)-acetophenone, -5'-chlorothenylidene-p-(4'-chlorophenyl)acetophenone.

These α-ethylenic ketones are obtained by condensation of 2-thenaldehyde or of a 5-halo-2-thenaldehyde with a ketone of formula $CH_3$—CO—$R_1$, in which $R_1$ has the meanings as given above, in the presence of an alkali agent.

The investigation of the anticoagulant activity of the new derivatives of 4-hydroxy-coumarine according to the invention was carried out on rabbits. Each test was conducted on a batch of 5 rabbits receiving the product to be tested. Concurrently, 5 rabbits received the standard substance, which is (1' - phenyl-2'-acetyl)-3-ethyl-4-hydroxy coumarine ("Warfarin") and 1 control animal received no product.

The single dose by which the amount of prothrombin of at least 3 animals out of 5 of a batch is lowered between 15 and 35% is investigated. The Quick times are determined every day after taking samples of venous blood from the marginal vein of the ear.

The standard substance is given the coefficient 100.

The following Table 1 gives the results obtained with the compounds of Formula II.

TABLE I

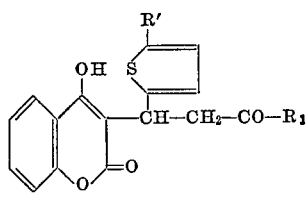

| | Coefficient |
|---|---|
| Standard | 100 |
| R'=Br; R₁=CH₃ | 250 |
| R'=Cl; R₁=CH₃ | 25 |
| R'=H; R₁=C₆H₅ | 5 |
| R'=H; R₁=C₆H₄—F(p) | 25 |
| R'=Cl; R₁=C₆H₄—Cl(p) | 200 |
| R'=Br; R₁=C₆H₅ | 8 |
| R'=Br; R₁=C₆H₄—Br(p) | 160 |
| R'=Br; R₁=C₆H₄—C₆H₄—Br(p) | 80 |

Table II shows the efficacy of the compounds according to the invention and of general Formula I.

TABLE II

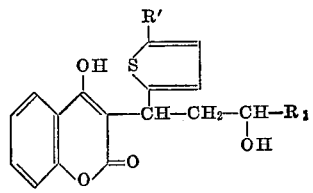

| | Coefficient |
|---|---|
| Standard | 100 |
| R'=Br; R₁=CH₃ | 550 |
| R'=Cl; R₁=CH₃ | 40 |
| R'=H; R₁=C₆H₅ | 80 |
| R'=H; R₁=C₆H₄—F(p) | 80 |
| R'=Cl; R₁=C₆H₄—Cl(p) | 800 |
| R'=Br; R₁=C₆H₅ | 80 |
| R'=Br; R₁=C₆H₄—Br(p) | 800 |
| R'=Br; R₁=C₆H₄—C₆H₄—Br(p) | 4000 |

The raticidical activity of certain compounds was investigated in connection with batches of adult white rats. These batches comprise 10 animals. The animals receive for one day wheat which contains the compound to be investigated and in the concentration of 0.005% after having been fed for several days with ordinary wheat. The poisoned food is replaced, from the second day, by ordinary grains.

With 3 - (4' - hydroxy-3'-coumarinyl)-3-(5"-bromo-2"-thienyl) - 1 - (4'-bromo-parabiphenylyl)-1-propanol, the mortality rate was 10 deaths out of 10, between the 6th and the 10th days after consumption of the poisoned food.

The poisoned baits were prepared by an impregnation of the wheat with an alcoholic solution of the compound to be investigated, then dried in an oven and colored with an oily dye solution.

The preparation according to this example is not limitative and the formulation can be effected by a support consumable by the rodents being sprayed with a solution of the compound in any solvent not having repulsive power. The product can also be administered in the form of a track poison in a powder adhering to the animal or by poisoning the drinking water.

The following results were obtained with 3-(4'-hyroxy-3'-coumarinyl)-3(5"-chloro - 2" - thienyl)-1-parachlorophenyl-1-propanol (R'=Cl; R₁—C₆H₄—Cl (p) or LM 550).

The tablets are standardised with 50 ml. of LM₅₅₀ and pharmaceutical carrier.

1ST OBSERVATION

Mrs. Anne F., 67 years old, thrombophebitis.
Treatment with 3 tablets the first day, subsequently 2 tablets and then 1 tablet per day. The amount of prothrombin is 30% the second day of treatment and is then maintained between 15 and 40%.

2ND OBSERVATION

Mr. Francis T., 43 years.
Arteriopathy of the left lower limb. No oscillations.
Recent acute pressure.
Treatment with LM₅₅₀. Therapeutic pattern: 3 tablets the first day, 2 tablets the second day, 2 tablets the third day, then 1½ tablets per day. The amount of prothrombin is 60% the first day and 30% the second day. It is easily controlled thereafter without any tendency to hemorrhage.

3RD OBSERVATION

Mr. Louis F., 65 years old.
Repetition of posterior infarct. Electrocardiogram, ECG with very deep necrosis wave.
Treatment with Heparin in turn with LM₅₅₀. Maintenance posology: 1 tablet per day, which is sufficient to maintain the weekly prothrombin amount below 40%. The absence of urinary hemorrhagic signs and the good stability of the prothrombinic reduction are noted.

EXAMPLE 1

4-(4-hydroxy-3'-coumarinyl)-4-(5"-chloro-2"-thienyl)-2-butanol

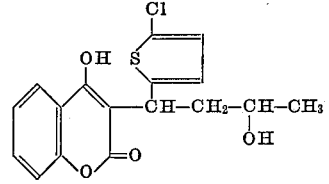

(a) 4 - (4' - hydroxy-3'-coumarinyl)-4-(5"-chloro-2"-thienyl)-butan-2-one.—As starting product, there is used the 5-chloro-thenylidene acetone, a compound referred to by S. B. Britton and W. L. Nobles, J. Miss. Acad. Sci. 6, 36–7, 1954–60. The authors do not specify any physical character of the product. The following constants were determined: 127° C./1 millibar for the boiling point, and 50° C' (hexane) for the melting point. 10.2 g. (0.054 mol) of 5-chlorotheylidene acetone are heated for 4 hours, while stirring and under reflux, with 9.77 g. (0.06 mol) of 4-hydroxy coumarine, in 90 ml. of water and 50 mg. of hexamethylene imine. On cooling, the brown oil which decants is solidified.

The product is solubilised in acetone and then it is precipitated with 2 volumes of water. After centrifuging and drying, it is recrystallised from benzene.

Yield: 13.5 g. (i.e. 70.5% of the desired product), melting at 142° C. (sealed tube).

Gravimetric analysis.—Calc'd for $C_{17}H_{13}ClO_4S$ (mol. wt. 348.5) (percent): C, 58.56; H, 3.75; Cl, 10.17. Found (percent): C, 58.70; H, 3.90; Cl, 10.03.

(b) 7 g. (0.02 mol) of the product obtained above are reduced with 12.4 g. (0.06 mol) of aluminum isopropylate in 150 ml. of isopropanol. After refluxing for one hour, the solution is poured on to ice and acidified with HCl.

After recrystallisation from the mixture of acetone and water, there are obtained 5.5 g. (of white product (78.5%) melting at 75° C. (sealed tube)).

Gravimetric analysis.—Calc'd for $C_{17}H_{15}ClO_4S$ (mol. wt. 350.80) (percent): C, 58.20; H, 4.31. Found (percent): C, 58.04; H, 4.14.

EXAMPLE 2

4-(4'-hydroxy-3'-coumarinyl)-4-(5''-bromo-2''-thionyl)-2-butanol

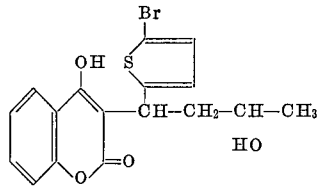

(a) 16.2 g. (0.1 mol) of 4-hydroxy coumarine, 21 g. (0.08 mol) of 5-bromothenylidene acetone (M.P.=63° C.—G. Pappalardo, Gazz. Chim. Ital. 89, 549, 1959) and 0.08 g. of hexamethylene imine and placed in a 500 ml. spherical flask with a stirrer mechanism and a reflux condenser.

Heating under reflux takes place for 4 hours. The organic oily phase is then allowed to decant, and this solidified on cooling.

This mass is solubilised in the cold in 400 ml. of acetone, whereafter it is filtered and 2.5 volumes of water are added. It is left standing for 16 hours, and the product which crystallises is centrifuged.

An analytically pure sample is obtained by recrystallisation from a mixture of equal parts of water and acetone; yield: 67%.

The 4 - (4' - hydroxy-3'-coumarinyl)-4-(5''-bromo-2''-thienyl)-2-butanone is obtained as fine white crystals, melting at 128° C. in a sealed tube (Gallenkamp apparatus).

Gravimetric analysis.—Calc'd for $C_{17}H_{13}BrO_4S$ (mol. wt.=393.25) (percent): C, 51.93; H, 3.33; Br, 20.33. Found (percent): C, 52.03; H, 3.45; Br, 20.16.

(b) 7.8 g. (0.02 mol) of the 4-(4'-hydroxy-3''-coumarinyl(4-5''-bromo-2''-thienyl)-2 - butanone as obtained above are reduced in anhydrous isopropanol with 12.4 g. (0.06 mol) of aluminum isopropylate.

The product, treated as in the preceding example, and recrystallised from a large volume of cyclohexane, is obtained in amorphous and hygroscopic form. Its melting point is 84° C. (sealed tube).

Gravimetric analysis.—Calc'd for $C_{17}H_{15}BrO_4S$ (mol. wt.=395.27) (percent): C, 51.66; H, 3.82. Found (percent): C, 51.47; H, 3.69.

EXAMPLE 3

3-(4'-hydroxy-3'-coumarinyl)-3-(2''-thienyl)-1-phenyl-1-propanol

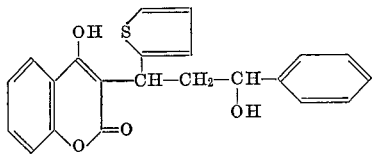

(a) 10.7 g. (0.05 mol) of a 1-phenyl-3-(2'- thienyl)-2-propen-1-one (M.P.=59° C.—J. Org. Chem. 14, 790–7, 1949, by W. S. Emerson) and 8.91 g. (0.055 mol) of 4-hydroxy coumarine are heated under reflux in 90 ml. of water in the presence of 0.1 g. of hexamethylene imine for 4 hours.

After decantation of the oily organic phase which is light yellow in color the solution is placed in acetone, caused to crystallise with water and, after centrifuging and drying, it is again recrystallised from benzene. The product crystallises as fine white crystals after a few hours at ambient temperature. The 3-(4'-hydroxy-3-coumarinyl)-3-(2'-thienyl)-propiophenone has a melting point of 145° C. (sealed tube).

Gravimetric analysis.—Calc'd for $C_{22}H_{16}O_4S$ (mol. wt.=376.41) (percent): C, 70.20; H, 4.28. Found (percent): C, 70.00; H, 4.26.

(b) 7.52 g. (0.02 mol) of 3-(4'-hydroxy-3'-coumarinyl)-3-(2'-thienyl) propiophenone are placed in 150 ml. of anhydrous isopropanol. 12.4 g. (0.06 mol) of aluminium isopropylate are added thereto in small quantities and while stirring and the mixture is refluxed for 1 hour while stirring.

The solution is poured into 600 ml. of iced water containing 20 ml. of HCl at 21° Bé.; the oil which decants is taken up while hot in a 5% sodium bicarbonate solution. The solution obtained, decolorised with animal charcoal, is filtered and acidified. The white precipitate which is obtained is taken up in ether; this solution is dried over $Na_2SO_4$ and two volumes of hexane are added thereto. The expected compound crystallises as a fine white powder melting at 101–105° C. (sealed tube, Gallenkamp apparatus). Yield=5.6 g. (75%).

Gravimetric analysis.—Calculated for $C_{22}H_{18}O_4S$ (mol. wt.=378.42) percent: C, 69.83; H, 4.79. Found (percent): C, 69.62; H, 4.85.

EXAMPLE 4

3-(4'-hydroxy-3'-coumarinyl)-3-(5''-chloro-2''-thienyl)-1-parachloro-phenyl-1-propanol

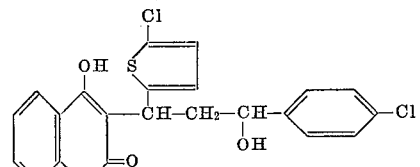

(a) 1 - parachlorophenyl - 3 - (5' - chloro-2'-thienyl)-2-propen-1-one.—(α) This new compound was prepared in the following manner:

4.4 g. of NaOH, in solution in 40 ml. of water and 20 ml. of ethanol, are cooled to 120° C., and then there are successively added at this temperature 13.2 g. (0.086 mol) of parachloro acetophenone and 12.6 g. of 5-chlorothiophene-2-aldehyde. The solution is left standing for 3 hours while stirring at ambient temperature and the precipitate which has formed is centrifuged off, whereafter it is washed with water and recrystallisetd from alcohol. Yield: 18.4 g., i.e. 75.7% of product, melting at 134° C.

Gravimetric analysis.—Calculated for $C_{13}H_8Cl_2OS$ (mol. wt. 283.16) percent: C, 55.14; H, 2.85. Found (percent): C, 55.07; H, 2.78.

(β) The ketone prepared according to α is condensed at the rate of 14.15 g. (0.05 mol) with 8.9 g. (0.055 mol) of 4-hydroxy coumarine in 80 ml. of water in the presence of 42 mg. of hexamethyleneimine. Heating takes place for 4 hours under reflux and, after recrystallisation, first of all from a mixture of acetone and water and then from benzene, there are obtained: 12.6 g. of 3 - (4' - hydroxy-3'-coumarinyl)-3-(5''-chloro - 2'' - thienyl) - parachloro propiophenone, melting at 162° C. (sealed tube).

Gravimetric analysis.—Calculated for $C_{22}H_{14}O_4Cl_2S$ (mol. wt. 445.30) percent: C, 59.34; H, 3.17; Cl, 15.92. Found (percent): C, 59.55; H, 3.33; Cl, 15.70.

(b) 4.45 g. (0.01 mole) of 3-(4'-hydroxy-3'-coumarinyl) - 3 - (5'' - chloro - 2'' - thienyl) - parachloro propiophenone, in solution in 75 ml. of isopropanol, are reduced with 6.12 g. (0.03 mole) of aluminium isopropylate, introduced while stirring and in small quantities at ambient temperature.

The solution is refluxed for one hour and, after cooling it is poured into 250 ml. of ice and 15 ml. of concentrated HCl. On standing, a white precipitate is obtained, which is centrifuged, washed with water, taken up in methanol and filtered.

5 volumes of water are added to this solution, and it is allowed to crystallise at ambient temperature.

The product is analytically pure and shows a pasty fusion at 104° C. (sealed tube). Yield=89%.

Gravimetric analysis.—Calculated for $C_{22}H_{16}Cl_2O_4S$ (mol. wt.=447.32) percent: C, 59.07; H, 3.61. Found (percent): C, 58.94; H, 3.82.

EXAMPLE 5

3-(4'-hydroxy-3'-coumarinyl)-3-(2''-thienyl)-1-parafluorophenyl-1-propanol

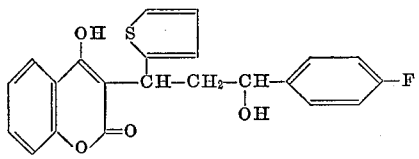

(a) The 1 - parafluorophenyl - 3 - (2' - thienyl) - 2-propen-1-one is mentioned by M. Welsch and collaborators, Experientia, 11, 350, 1955. Its characteristics are not indicated. This product was prepared with a yield of 81% from parafluoro-acetophenone. Its melting point is 91° C.

15.4 g. (0.066 mol) of this ketone were heated under reflux for 4 hours with 11.9 g. (0.0726 mol) of 4-hydroxy coumarine in 100 ml. of water and in presence of 60 mg. of hexamethylene imine.

The product was purified. Yield 54%. Melting point (methanol)—155° C. (sealed tube).

*Gravimetric analysis.*—Calculated for $C_{22}H_{15}FO_4S$ (mol. wt. 394.4) percent: C, 66.99; H, 3.84; F, 4.82. Found (percent): C, 66.86; H, 3.92; F, 5.02.

(b) 10.64 g. (0.0277 mol) of 3-(4'-hydroxy-3'-coumarinyl) - 3 - (2'' - thienyl) - parafluoro propiophenone, prepared according to (a), are reduced in 200 ml. of isopropanol with 16.5 g. (0.081 mol) of aluminium isopropylate. After one hour under reflux, the solution is poured into 400 ml. of iced water, contained 20 ml. of concentrated HCl. The aqueous phase is decanted, taken up in 5% sodium bicarbonate at 50° C. and the alkali solution is acidified. The white precipitate is centrifuged and recrystallised from a mixture of methanol and water. 8 g. of product melting at 75° C. (sealed tube) are obtained. Yield=77%.

*Gravimetric analysis.*—Calculated for $C_{22}H_{17}FO_4S$ (mol. wt.=396.42) percent: C, 66.65; H, 4.32. Found (percent): C, 66.54; H, 4.49.

EXAMPLE 6

3-(4'-hydroxy-3'-coumarinyl)-3-(5''-bromo-2''-thienyl)-1-phenyl-1-propanol

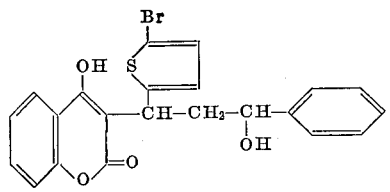

(a) 3-(4-hydroxy-3'-coumarinyl) - 3 - (5''-bromo-2''-thienyl) - propiophenone.—(α) phenyl-3-(5''-bromo-2''-thienyl)-2-propen-1-one.

This new manner compound was prepared in the following manner:

7.04 g. of NaOH in solution in 70 ml. of water and 40 ml. of ethanol were placed in a 500 ml. spherical flask while stirring. 18 g. of acetophenone (0.15 mol) were then introduced and cooling took place to 12° C. 28.65 g. (0.15 mol) of 5-bromo-2-formyl thiophene are slowly added and stirring takes place for 3 hours at ambient temperature.

The medium is acidified and the product, which crystallises, is centrifuged and recrystallised from alcohol. There are obtained 32.7 g. (74%) of the desired ketone, which melts at 72° C. (sealed tube).

*Gravimetric analysis.*—Calculated for $C_{13}H_9BrOS$ (mol. wt. 293.18) percent: C, 53.25; H, 3.10. Found (percent): C, 53.39; H, 3.31.

(β) 19.53 g. of 1-phenyl-3-(5'-bromo-2'-thienyl)-2-propen-1-one (0.066 mol) and 11.88 g. (0.0726 mol) of 4-hydroxy coumarine are heated for 4 hours under reflux in 120 ml. of water and 0.133 ml. of hexamethylene imine.

The organic phase solidifies on cooling. It is taken up in 200 ml. of acetone and is caused to crystallise by adding 4 volumes of water. After standing for one night, it is centrifuged and recrystallised from methanol after boiling in animal charcoal. There are obtained 16.7 g. (55%) of white crystals, melting at 164° C. (sealed tube).

*Gravimetric analysis.*—Calculated for $C_{22}H_{15}BrO_4S$ (mol. wt.=455.32) percent: C, 58.04; H, 3.32; Br, 17.55. Found (percent): C, 57.80; H, 3.48; Br, 17.44.

(b) 6.83 g. (0.015 mol) of 3-(4'-hydroxy-3'-coumarinyl)-3-(5''-bromo-2''-thienyl)-propiophenone are reduced in 200 ml. of isopropanol with 9.18 g. (0.045 mol) of aluminium isopropylate. After being refluxed for one hour, the solution is poured into 500 ml. of iced water containing 20 ml. of HCl. The precipitated is centrifuged, washed and taken up in a 5% solution of $HNaCO_3$ in the hot state. Acidification is carried out and the compound which precipitates is dissolved in ether, and 3 volumes of hexane are added to the dried solution. The product crystallises at ambient temperature. It melts at 110–115° C. (sealed tube). Yield=5.2 g. (76%).

*Gravimetric analysis.*—Calculated for $C_{22}H_{17}BrO_4S$ (mol. wt.=457.34) percent: C, 57.78; H, 3.74. Found (percent): C, 57.73; H, 3.90.

EXAMPLE 7

3-(4'-hydroxy-3'-coumarinyl)-3-(2''-thienyl)-1-paranitrophenyl-1-propanol

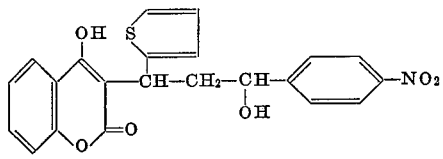

(a) 3-(4'-hydroxy-3'-coumarinyl)-3-(2'-thienyl)-paranitropropiophenone.—2.59 g. (0.01 mol) of 1-paranitrophenyl-3-(2'-thienyl) 2-propen-1-one (M.P.=171° C., Ukrain. Khim. Zhur., 27, 379–84, 1961) and 1.78 g. (0.011 mol) of 4-hydroxy coumarine are heated for 4 hours under reflux in 10 ml. of dioxane containing 0.1 g. of piperidine. The solvent is evaporated in vacuo and the residue recrystallised twice from a mixture of acetone and water (40–60). The compound obtained melts at 201–202° C. (sealed tube). Yield=1.8 g., i.e. 42%.

*Gravimetric analysis.*—Calculated for $C_{22}H_{15}NO_6S$ (mol. wt.=421.40) percent: C, 62.70; H, 3.59. Found (percent): C, 62.53; H, 3.70.

(b) 3.4 g. (0.008 mol) of 3-(4'-hydroxy-3'-coumarinyl)-3-(2''-thienyl)-paranitro-propiophenone are placed in 60 ml. of anhydrous isopropanol and reduced with 4.9 g. (0.024 mol) of aluminium isopropylate. The solution is poured into 200 ml. of water and 10 ml. of concentrated HCl. The precipitate is solubilised in $HNaCO_3$ and the solution is decolorised and acidified. Recrystallised from methanol-water, the product has a pasty fusion at 95° C. (sealed tube). Yield=2.1 g. (62%).

*Gravimetric analysis.*—Calculated for $C_{22}H_{17}NO_6S$ (mol. wt. 423.43) percent: C, 62.40; H, 4.05. Found (percent): C, 62.22; H, 4.12.

EXAMPLE 8

3-(4'-hydroxy-3-coumarinyl)-3-(5''-methyl-2''-thienyl)-1-phenyl-1-propanol

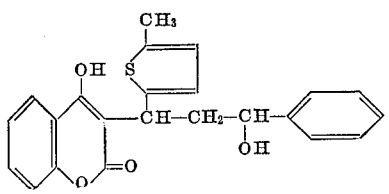

(a) 3-(4'-hydroxy-3'-coumarinyl)-3-(5''-methyl-2''-thienyl)-propiophenone.—(α) preparation of the 1-phenyl-3-(5''-methyl-2''-thienyl)-2-propen-1-one.

10.4 g. (0.086 mol) of acetophenone in 20 ml. of alcohol are added to 4.4 g. (0.11 mol) of sodium hydroxide solution in 20 ml. of water, whereafter 10.8 g. (0.086 mol) of 5-methyl thenaldehyde are added at 12–15° C. and stirring takes place for 3 hours at ambient temperature. The oily product is extracted with ether, dried and distilled, B.P.=154–155° C./0.55 millibar. Yield=62.5%.

(β) 9.1 g. (0.04 mol) of this ketone are heated under reflux for 4 hours with 7.1 g. (0.044 mol) of 4-hydroxy-coumarine in 65 ml. of water and 0.032 g. of hexamethylene imine.

The oily organic phase is washed with water, and then caused to crystallize in a mixture of acetone and water. The crystals obtained are recrystallized from methanol and they melt at 142° C. (sealed tube).

*Gravimetric analysis.*—Calculated for $C_{23}H_{18}O_4S$ (mol. wt.=390.43) percent: C, 70.75; H, 4.65. Found (percent): C, 70.63; H, 4.70.

(b) 2.34 g. (0.006 mol) of 3 - (4' - hydroxy - 3'-coumarinyl) - 3 - (5" - methyl - 2" - thienyl) propiophenone are reduced in 45 ml. of isopropanol with 3.67 g. (0.018 mol) of aluminum isopropylate. The compound obtained melts at 78–82° C. and the yield is 84%.

*Gravimetric analysis.*—Calculated for $C_{23}H_{20}O_4S$ (mol wt.=392.42) percent: C, 70.39; H, 5.14. Found (percent): C, 70.23; H, 5.29.

EXAMPLE 9

3-(4'-hydroxy-3'-coumarinyl-3-(5"-bromo-2"-thienyl)-1-parabromophenyl-1-propanol

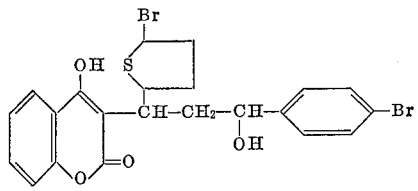

(a) 3 - (4' - hydroxy - 3' - coumarinyl) - 3 - (5"-bromo - 2" - theinyl - parabromopropiophenone.—(α) 1 - parabromophenyl - 3 - (5' - bromo - 2' - thienyl)-2-propen-1-one.

9.95 g. (0.05 mol) of parabromoacetophenone in 12 ml. of alcohol are added to 2.54 g. of sodium hydroxide in solution in 25 ml. of water.

9.95 g. (0.05 mol) of 5 - bromothiophene - 2 - aldehyde are added dropwise at 12° C. and stirring takes place for 3 hours at ambient temperature. The precipitate is centrifuged, washed with water and recrystallized from alcohol. It melts at 144° C. Yield=13.5 g. (72.5%).

(β) 12.4 g. (0.033 mol) of this ketone, 5.94 g. (0.036 mol) of 4-hydroxy-coumarine, 33 ml. of dioxane and 0.1 g. of piperidine are heated for 5 hours under reflux. The solvent is evaporated in vacuo and the residue taken up in acetone. Two volumes of water are added. A small quantity of ketone first of all crytaillizes and this is eliminated, and then the product is allowed to crystallize for some hours.

The product obtained is recrystallized from methanol; M.P.=155° C. (sealed tube); yield=8.4 g. (48%).

*Gravimetric analysis.*—Calculated for $C_{22}H_{14}Br_2O_4S$ (mol. wt.=534.23) percent: C, 49.46; H, 2.64; Br, 29.92. Found (percent): C, 49.58; H, 2.74; Br, 29.81.

(b) 5.34 g. (0.01 mol) of 3 - (4' - hydroxy - 3'-coumarinyl) - 3 - (5" - bromo - 2" - thienyl) parabromopropiophenone in 100 ml. of isopropanol are reduced with 6.12 g. (0.03 mol) of aluminum isopropylate. After refluxing for 1 hour, the solution is poured into water made acid with HCl. The solid which precipitates is taken up in hot bicarbonate, in which it has little solubility, and the alkali solution is acidified. The product which precipitates is recrystallized from methanol-water. The compound melts at 103–105° C. (sealed tube). Yield=74%.

*Gravimetric analysis.*—Calculated for $C_{22}H_{16}Br_2O_4S$ (mol wt.=536.25) percent: C, 49.27; H, 3.00. Found (percent): C, 49.15; H, 2.96.

This product, like that of the preceding examples, is a mixture of racemic diastereoisomers. After being recrystallized several times from the methyl isobutyl ketone hexane mixture, there is isolated from the compound melting at 103–105° C., a compound which melts at 187° C. (sealed tube) and which is undoubtedly one of the racemic isomers.

The gravimetric analysis of this compound gave the following results:

Calculated (percent): C, 49.27; H, 3.00. Found (percent): C, 49.09; H, 3.20.

EXAMPLE 10

3-(4'-hydroxy-3'-coumarinyl-3-(2"-thienyl)-1-parabiphenyl-1-propanol

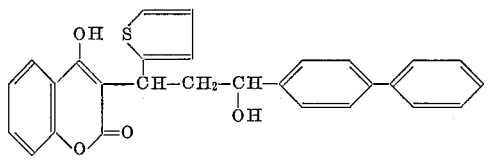

(a) 3 - (4' - hydroxy - 3' - coumarinyl) - 3 - (2'-thienyl) - paraphenyl - propiophenone.—14.5 g. (0.05 mol) of thenylidene paraphenylacetophenone (M.P.=157° C.—Bull. Soc. Chim. Fr., 1958, pages 758–61) are heated under reflux with 8.91 g. (0.055 mol) of 4-hydroxy coumarine in 50 ml. of dioxane in the presence of 0.45 g. of piperidine.

After evaporation of the solvent in vacuo, the residue is taken up in the mixture of acetone and water and left to crystallize at ambient temperature. The product is centrifuged and recrystallized from alcohol. The compound melts at 170° C. (sealed tube). Yield=10.8 g. (48%).

*Gravimetric analysis.*—Calculated for $C_{28}H_{20}O_4S$ (mol. wt.=452.50) percent: C, 74.31; H, 4.46. Found (percent): C, 74.46; H, 4.21.

(b) 3.2 g. (0.007 mol) of 3-(4'-hydroxy-3'-coumarinyl)-3-(2"-thienyl)-paraphenyl propiophenone, solubilised in 50 ml. of isopropanol, are reduced with 4.28 g. (0.021 mol) of aluminum isopropylate. After heating for one hour under reflux, the solution is poured into water made acid with HCl. The precipitate formed is centrifuged and washed with water. It is then dissolved in acetone, filtered and re-precipitated with 5 volumes of water. This compound, after drying in vacuo, shows a pasty fusion at 150° C. (sealed tube). Yield=82%.

*Gravimetric analysis.*—Calculated for $C_{28}H_{22}O_4S$ (mol. wt.=454.52) percent: C, 73.99; H, 4.88. Found (percent): C, 73.90, H, 4.94.

EXAMPLE 11

3-(4'-hydroxy-3'-coumarinyl)-3-(5"-bromo-2"-thienyl)-1-(4'-bromo-para-biphenylyl)-1-propanol

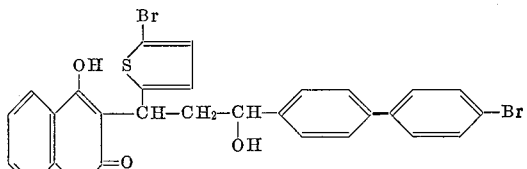

(a) 3-(4'-hydroxy-3'-coumarinyl)-3 - (5" - bromo - 2"-thienyl)-para-(4'-bromophenyl)-propiophenone.—(α) the 5'-bromo-thenilidene para-(4' - bromophenyl) - acetophenone was obtained by the action of 27.5 g. (0.1 mol) of para-(4'-bromophenyl)-acetophenone, in solution in 250 ml. of alcohol, on 19.1 g. (0.1 mol) of 5-bromothenaldehyde in the presence of 5.08 g. of NaOH in 20 ml. of water, in accordance with the procedure of the previous examples. Recrystallised from ethyl acetate, the product melts at 164° C. Yield=78%.

11

(β) 29.8 g. (0.66 mol) of this ketone and 11.8 g. (0.072 mol) of 4-hydroxy coumarine are heated under reflux in 70 ml. of dioxane in the presence of 0.5 g. of piperidine for 5 hours. The solvent is evaporated in vacuo and the residue recrystallised from 300 ml. of acetone. The centrifuged product is once again crystallised in a mixture of alcohol and dioxane.

16.1 g. (40%) of compound melting at 205° C. are obtained.

*Gravimetric analysis.*—Calculated for $C_{28}H_{18}Br_2O_4S$ (mol. wt.=610.32) percent: C, 55.10; H, 2.97; Br, 26.19. Found (percent): C, 54.85; H, 2.91; Br, 26.06.

(b) 10.98 g. (0.018 mol) of 3-(4'-hydroxy-3'-coumarinyl)-3-(5''-bromo - 2'' - thienyl) - para - (4' - bromopheny)-propiophenone are reduced in 150 m. of isopropanol with 11.01 g. (0.054 mol) of aluminum diisopropylate. The precipitate obtained in acidified water is centrifuged and washed with water. It is solubilised in 50 ml. of acetone, filtered and 200 ml. of water are added. Left at ambient temperature, the solution allows the expected compounds to crystallise slowly. It melts at 112–115° C. Yield=79%.

*Gravimetric analysis.*—Calculated for $C_{28}H_{20}Br_2O_4S$ (mol. wt.=612.34) percent: C, 54.92; H, 3.29. Found (percent): C, 55.97; H, 3.51.

Recrystallised twice from a mixture of methylisobutylketone and hexane, this compound permits the isolation of the diastereoisomer melting at 203° C. (sealed tube).

*Gravimetric analysis.*—Calculated for $C_{28}H_{20}Br_2O_4S$ (percent): C, 54.92; H, 3.29; Br, 26.10. Found (percent): C, 55.10; H, 3.49; Br, 26.12.

EXAMPLE 12

3-(4'-hydroxy-3'-coumarinyl)-3-(5''-bromo-2''-thienyl)-1-parabiphenylyl-1-propanol

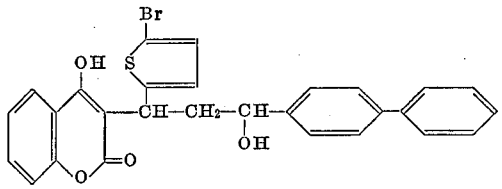

(a) 3-4'-hydroxy - 3'-coumarinyl - 3 - (5'' - bromo - 2''-thienyl)-p-phenyl propiophenone.—(α) 5' - bromothenylidene paraphenyl acetophenone is prepared with a yield of 84% from 5-bromothenaldehyde and paraphenyl acetophenone. This ketone melts at 132° C.

(b) 29.52 g. (0.08 mol) of the above ketone and 14.25 g. (0.088 mol) of 4-hydroxy coumarine are heated in 80 ml. of dioxane in the presence of 0.7 g. of piperidine. The heating under reflux is stopped after 5 hours and the solvent is distilled in vacuo. The residue is crystallised in methanol, and then a fresh recrystallisation is carried out in the mixture of ethanol and dioxane (90–10). The compound obtained melts at 195° C. Yield=20.1 g., i.e. 45%.

*Gravimetric analysis.*—Calculated for $C_{28}H_{19}BrO_4S$ (mol. wt. 531.41) percent: C, 63.28; H, 3.60; Br, 15.04. Found (percent): C, 63.18; H, 3.53; Br, 15.16.

(b) 10.62 g. (0.02 mole) of 3-(4'-hydroxy-3'-coumarinyl) -3 - (5''-bromo - 2'' - thienyl)-paraphenyl propiophenone are reduced with 12.24 g. (0.06 mol) of aluminium isopropylate in solution in 250 ml. of isopropanol. It is poured into acidified water and the precipitate is solubilised in acetone, filtered and caused to precipitate by adding water. The compound obtained is recrystallised twice from the mixture of methylisobutylketone and hexane to obtain 2 g. of compound melting at 193° C. (sealed tube).

*Gravimetric analysis.*—Calculated for $C_{28}H_{21}BrO_4S$ (mol. wt.=533.45) percent: C, 63.04; H, 3.97. Found (percent): C, 63.16; H, 4.11.

12

EXAMPLE 13

3-(4'-hydroxy-3'-coumarinyl)-3-(2''-thienyl)-1-(4'-bromo-parabiphenyl)-1-propanol

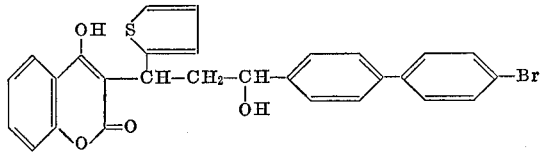

(a) 3 - (4' - hydroxy - 3' - coumarinyl)-3-(2'-thienyl)-p-(4' - bromophenyl)-propiophenone.—(α) Thenylidene para-(4'-bromophenyl)-acetophenone.

27.5 g. (0.1 mol) of para-(4'-bromophenyl)-acetophenone, in solution in 250 ml. of alcohol, are caused to react with 11.2 g. (0.1 mol) of thiophene - 2 - aldehyde in the presence of 5.08 g. of sodium hydroxide dissolved in 20 ml. of water. The reaction is very fast and the product which solidifies is centrifuged, washed with water and recrystallised from ethyl acetate. The ketone obtained melts at 180° C. The yield is 27.3 g. (74%).

(β)-26.93 g. (0.073 mol) of the above ketone are heated with 13.01 g. (0.08 mol) of 4-hydroxy coumarine in 70 ml. of dioxane in the presence of 0.65 g. of piperidine. After refluxing for 5 hours, evaporation to dryness in vacuo is carried out. The residue, washed with ethyl acetate is crystallised in the mixture of alcohol/dioxane (90:10). The compound obtained melts at 203° C. (sealed tube). The yield is 18 g., i.e. 46%.

*Gravimetric analysis.*—Calculated for $C_{28}H_{19}BrO_4S$ (mol. wt.=531.41) percent: C, 63.28; H, 3.60; Br, 15.04. Found (percent): C, 63.10; H, 3.74; Br, 15.24.

(b) 10.62 g. (0.02 mole) of 3 - (4' - hydroxy-3'-coumarinyl) - 3 - (2' - thienyl)-para-(4' - bromophenyl)-propiophenone, in solution in 150 ml. of isopropanol and 50 ml. of dioxane, are reduced with 12.24 g. (0.06 mol) of aluminium isopropylate. The substance is heated under reflux for 1½ hours and is then poured into 500 ml. of iced water and 50 ml. of concentrated HCl. An immediate precipitation is obtained. The product is centrifuged and washed with water. It is recrystallised from a mixture of acetone and water. It melts at 100–105° C. (sealed tube).

*Gravimetric analysis.*—Calculated for $C_{28}H_{21}BrO_4S$ (mol. wt.=533.45) percent: C, 63.04; H, 3.97. Found (percent): C, 63.13; H, 4.05.

EXAMPLE 14

3-(4'-hydroxy-3'-coumarinyl)-3-(5''-chloro-2''-thienyl)-1-(4'-chloro-parabiphenylyl)-1-propanol

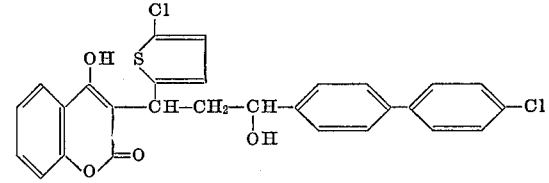

(a) 3-(4'-hydroxy -3' - coumarinyl) - 3 - (5''-chloro-2'' - thienyl)-p-(4' - chlorophenyl)-propiophenone.—(α) 5' - chlorothenylidene-para-(4' - chlorophenyl)-acetophenone.

10 g. (84%) of this compound, melting at 142° C., were obtained from 7.68 g. (0.033 mol) of para(4'-chlorophenyl)-acetophenone and 4.88 g. (0.033 mol) of 5'-chloro - 2 - formyl thiophene in 70 ml. of alcohol, in the presence of 1.7 g. of NaOH in 10 ml. of water.

(β) 9.36 g. of this ketone (0.026 mol) and 4.63 g. of 4-hydroxy coumarine (0.0286 mol) are heated for 5 hours under reflux in 25 ml. of dioxane and in the presence of 0.25 g. of piperidine. The solvent is evaporated in vacuo, the residue is washed with water and then with alcohol and recrystallised from ethyl acetate. The compound obtained melts at 192–193° C. (sealed tube). The yield is 5.9 g., i.e. 42%.

*Gravimetric analysis.*—Calculated for $C_{28}H_{18}Cl_2O_4S$ (mol. wt.=521.39) percent: C, 64.50; H, 3.48; Cl, 13.60. Found (percent): C, 64.39; H, 3.60; Cl, 13.51.

(b) 4.95 g. of 3 - (4' - hydroxy - 3' -coumarinyl)-3 - (5" - chloro - 2" - thienyl)-parachlorophenyl propiophenone are reduced with 5.4 g. of aluminium isopropylate in 160 ml. of isopropanol.

Heating takes place for one hour under reflux and the substance is poured into 300 ml. of iced water containing 30 ml. of concentrated HCl. A whitish precipitate is immediately formed. It is centrifuged and washed with water. It is sparingly soluble in a 5% bicarbonate solution when hot. The product is dissolved in acetone and 3 volumes of water are added to the solution which is obtained. The white product crystallises slowly. It melts at 92–95° C. (sealed tube). Yield=78%.

Crystallisation twice from the mixture of methyl isobutylketone and hexane enables an isomer melting at 189° C. (sealed tube) to be obtained.

Gravimetric analysis.—Calculated for $C_{28}H_{20}Cl_2O_4S$ (mol. wt.=523.41) (percent): C, 64.25; H, 3.86. Found (percent): C, 64.30; H, 3.84.

EXAMPLE 15

3-(4'-hydroxy-3'-coumarinyl)-3-(5"-bromo-2"-thienyl)-1-(4'-nitroparabiphenyl)-1-propanol

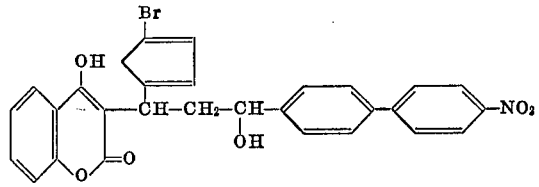

(a) 3 - (4' - hydroxy - 3' - coumarinyl) - 3 - (5"-bromo - 2" - thienyl)-para - (4' - nitrophenyl)-propiophenone.

18.63 g. (0.045 mol) of 5'-bromo thenylidene-para-(4'-nitrophenyl)-acetophenone (M.P.=190° C. on a Kofler bench) and 8.01 g. (0.0495 mol) of 4-hydroxycoumarine are heated for 5 hours under reflux in 45 ml. of dioxane and 0.4 g. of piperidine. The solvent is evaporated in vacuo and the residue is washed with ethyl acetate. After being recrystallised twice from methylisobutylketone, the product obtained melts at 187° C. in a sealed tube; yield 10.7 g.

Gravimetric analysis.—Calculated for $C_{28}H_{20}BrNO_6S$ (mol. wt.=576.40) percent: C, 58.34; H, 3.15; Br, 18.87. Found (percent): C, 58.43; H, 3.6; Br, 14.06.

(b) 3.45 g. (0.06 mol) of the above compound are reduced in 45 ml. of isopropanol and 15 ml. of dioxane with 3.67 g. (0.018 mol) of aluminium isopropylate. Heating takes place for 1½ hours under reflux and the solution is poured into 250 ml. of iced water +10 ml. of concentrated HCl.

The precipitate is centrifuged, washed with water and recrystallised twice from methanol. It melts at 203° C. (sealed tube).

Gravimetric analysis.—Calculated for $C_{28}H_{20}BrNO_6S$ (mol. wt.=578.43) percent: C, 58.18; H, 3.48. Found (percent): C, 58.21; H, 3.66.

What we claim is:

1. A 4-hydroxy coumarine of the formula

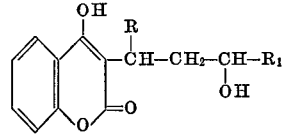

in which

R is a member of the group formed by the thienyl, methyl-thienyl, halothienyl and nitrothienyl radicals; and $R_1$ is a member of the group formed by the methyl, phenyl, halophenyl, nitrophenyl, diphenyl, halodiphenyl and nitrodiphenyl radicals.

2. 3-(4'-hydroxy - 3' - coumarinyl) - 3 - (5"-chloro-2"-thienyl) - 1 - parachlorophenyl-1 propanol, according to claim 1.

3. 3-(4'-hydroxy - 3' - coumarinyl) - 3 - (5"-bromo-2"-thienyl) - 1 - (4'-bromoparabiphenylyl)-1-propanol, according to claim 1.

4. 4-(4'-hydroxy - 3' - coumarinyl)- 4 - (5"-bromo-2"-thienyl)-2 butanol, according to claim 1.

5. 3-(4'-hydroxy - 3' - coumarinyl) - 3 - (5" - chloro-2"-thienyl)-1-parachlorophenyl-1-propanol, according to claim 1.

6. 3-(4'-hydroxy - 3' - coumarinyl) - 3 - (5"-bromo-2"-thienyl)-1-parabromo-phenyl-1-propanol, according to claim 1.

References Cited

Roberts, et al., Basic Principles of Org. Chem. (Benjamin, N.Y., 1964), pp. 455–7.

HENRY R. JILES, Primary Examiner

C. M. SHURKO, Assistant Examiner

U.S. Cl. X.R.

260—332.3; 424—275

UNITED STATES PATENT OFFICE
CERTIFICATE OF CORRECTION

Patent No. 3,574,234            Dated April 6, 1971

Inventor(s)     Eugene BOSCHETTI et al.

It is certified that error appears in the above-identified patent and that said Letters Patent are hereby corrected as shown below:

Column 5, the formula at line 5, $$\begin{array}{c} CH \\ HO \end{array} \quad \text{should be} \quad \begin{array}{c} CH \\ | \\ OH \end{array}$$

Column 7, line 26, (0.0277 mol)      should be      (0.027 mol)

Signed and sealed this 3rd day of August 1971.

(SEAL)
Attest:

EDWARD M. FLETCHER, JR.      WILLIAM E. SCHUYLER, JR
Attesting Officer              Commissioner of Patents